United States Patent
Teranishi et al.

(10) Patent No.: US 11,054,879 B2
(45) Date of Patent: Jul. 6, 2021

(54) SAFETY CONTROLLER

(71) Applicant: OMRON Corporation, Kyoto (JP)

(72) Inventors: Keiichi Teranishi, Numazu (JP); Daisuke Yagi, Otsu (JP); Akihiro Yonezawa, Kusatsu (JP); Shotaro Koga, Kusatsu (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 16/641,670

(22) PCT Filed: Oct. 2, 2018

(86) PCT No.: PCT/JP2018/036818
§ 371 (c)(1),
(2) Date: Feb. 25, 2020

(87) PCT Pub. No.: WO2019/073856
PCT Pub. Date: Apr. 18, 2019

(65) Prior Publication Data
US 2020/0249741 A1 Aug. 6, 2020

(30) Foreign Application Priority Data
Oct. 11, 2017 (JP) .............................. JP2017-197573

(51) Int. Cl.
*G06F 1/3212* (2019.01)
*G06F 1/28* (2006.01)

(52) U.S. Cl.
CPC .............. *G06F 1/3212* (2013.01); *G06F 1/28* (2013.01)

(58) Field of Classification Search
CPC .................................. G06F 1/28; G06F 1/3212
See application file for complete search history.

(56) References Cited

U.S. PATENT DOCUMENTS

2007/0028129 A1* 2/2007 Schumacher ......... G06F 1/3203
 713/320
2007/0285950 A1 12/2007 Nakamura et al.
(Continued)

FOREIGN PATENT DOCUMENTS

JP 2007-310693 A 11/2007
JP 2009-527934 A 7/2009
(Continued)

OTHER PUBLICATIONS

English translation of the International Search Report("ISR") of PCT/JP2018/036818 dated Dec. 18, 2018.
Written Opinion("WO") of PCT/JP2018/036818 dated Dec. 18, 2018.

*Primary Examiner* — Mark A Connolly
(74) *Attorney, Agent, or Firm* — Metrolex IP Law Group, PLLC

(57) ABSTRACT

The present invention achieves high speed safe response performance. A safety controller (100) includes a first voltage monitoring circuit (12) and a second voltage monitoring circuit (22). The first voltage monitoring circuit (12) is an AD converter which operates upon receiving electric power from a second electric power source (21) and which transmits, to a second MPU (20), a signal that gives notification of occurrence of an anomaly in a first voltage value. The second voltage monitoring circuit (22) is an AD converter which operates upon receiving electric power from a first electric power source (11) and which transmits, to a first MPU (10), a signal that gives notification of occurrence of an anomaly in a second voltage value.

2 Claims, 3 Drawing Sheets

(56) References Cited

U.S. PATENT DOCUMENTS

2010/0316100 A1    12/2010  Snauwaert
2018/0372782 A1*  12/2018  Tang .................. H02J 13/0013

FOREIGN PATENT DOCUMENTS

| JP | 2015-148973 A | 8/2015 |
| JP | 2017-175731 A | 9/2017 |

* cited by examiner

SAFETY CONTROLLER

TECHNICAL FIELD

The present invention relates to a safety controller.

BACKGROUND ART

A safety controller is conventionally known that ensures a high level of safety and a high level of reliability by carrying out not only a logic operation process and an input-output control process, each of which is carried out by an industrial control device such as a programmable controller (programmable logic controller, hereinafter abbreviated as "PLC"), but also a safety self-diagnosis process. For example, Patent Literature 1 discloses a safety controller that achieves an IO configuration that is suitable for achievement of control required by equipment. The safety controller of Patent Literature 1 achieves an IO unit that can easily respond to a change in system and/or addition of a system without any waste while avoiding an increase in wire for an IO electric power source.

CITATION LIST

Patent Literature

[Patent Literature 1]
Japanese Patent Application Publication Tokukai No. 2007-310693 (Publication date: Nov. 29, 2007)

SUMMARY OF INVENTION

Technical Problem

Such a safety controller as described earlier is being increasingly required to, for example, have higher speed safe response performance (performance of responding, with a high level of safety and with a high level of reliability, to inputs from various input devices). Specifically, a safety controller is being more required than ever to, for example, (i) allow a control process and a response process to be carried out at a higher speed and with higher accuracy, (ii) enable storage of a record of an execution process, and (iii) achieve a smaller device. For example, a demand for safe response performance with respect to equipment is stringent in an automobile manufacturing line or a semiconductor production line.

An example of the present disclosure has an object to achieve a safety controller that has higher speed safe response performance.

Solution to Problem

In an example of the present disclosure, a safety controller includes: a first MPU and a second MPU connected to each other via a serial bus; a first electric power source and a second electric power source, connected via electric power supply lines to the first MPU and the second MPU, respectively, for supplying electric power to the first MPU and the second MPU, respectively; a first voltage monitoring circuit (1) electrically connected to an electric power supply line extending from the first electric power source to the first MPU, (2) connected to the second MPU via a signal line, (3) connected to the second electric power source via an electric power supply line, and (4) including a first AD converter that operates with use of operating electric power obtained from the second electric power source; and a second voltage monitoring circuit (1) electrically connected to an electric power supply line extending from the second electric power source to the second MPU, (2) connected to the first MPU via a signal line, (3) connected to the first electric power source via an electric power supply line, and (4) including a second AD converter that operates with use of operating electric power obtained from the first electric power source, the first MPU and the second MPU communicating with each other in conformity to an Ethernet protocol without via any Ether PHY while a buffer for creating a clock delay is provided in a clock line between the first MPU and the second MPU, the first voltage monitoring circuit (1) monitoring a first voltage value, which is a voltage of electric power supplied from the first electric power source to the first MPU, with use of a digital signal that indicates the first voltage value and is outputted by the first AD converter which has received an analogue signal that indicates the first voltage value, and (2) upon sensing an anomaly in the first voltage value, transmitting, to the second MPU, a signal that gives notification of occurrence of the anomaly, and the second voltage monitoring circuit (1) monitoring a second voltage value, which is a voltage of electric power supplied from the second electric power source to the second MPU, with use of a digital signal that indicates the second voltage value and is outputted by the second AD converter which has received an analogue signal that indicates the second voltage value, and (2) upon sensing an anomaly in the second voltage value, transmitting, to the first MPU, a signal that gives notification of occurrence of the anomaly.

Advantageous Effects of Invention

An example of the present disclosure makes it possible to achieve a safety controller that has higher speed safe response performance.

DESCRIPTION OF EMBODIMENTS

Figure 1:
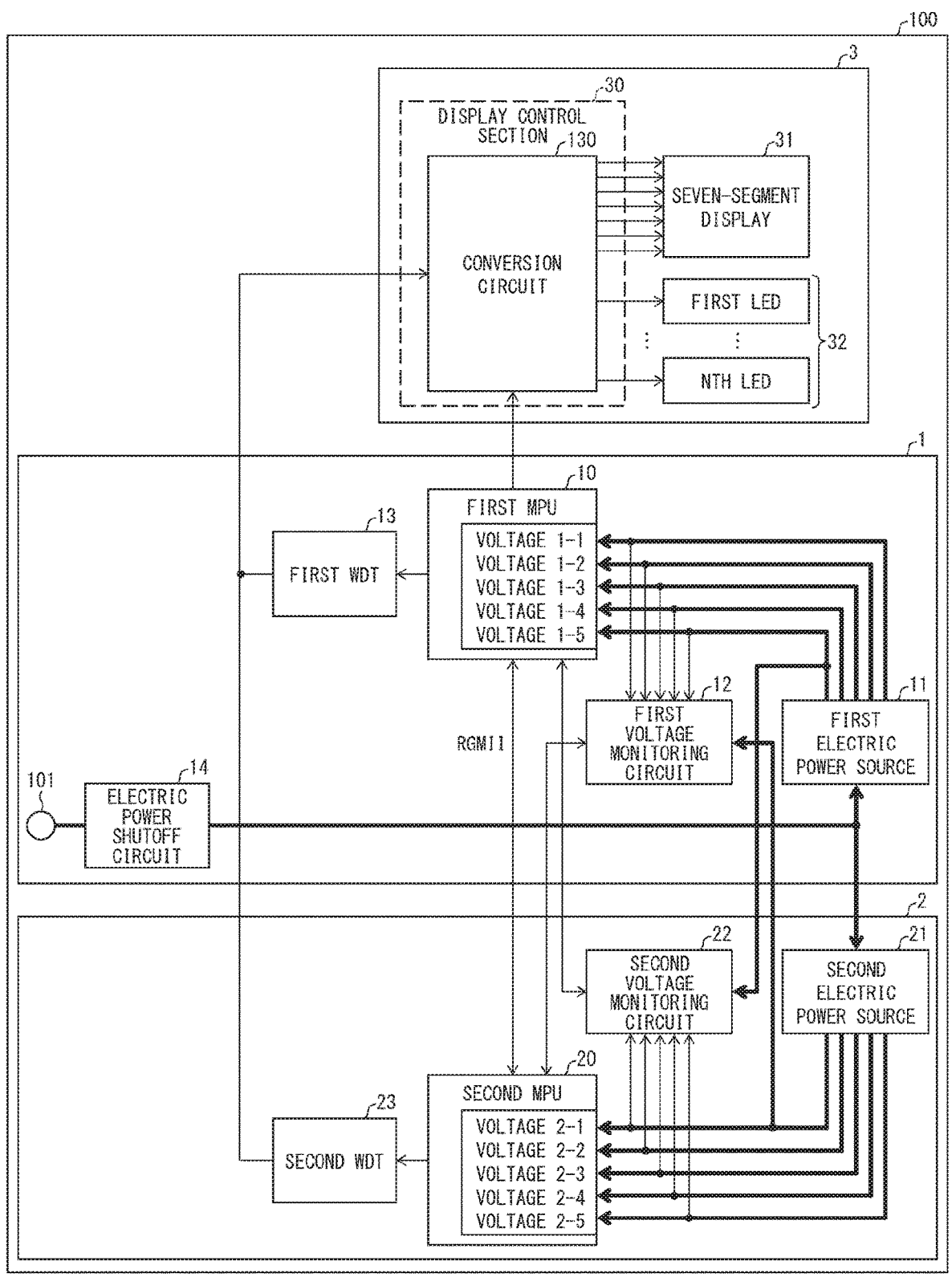
FIG. 1 is a view schematically illustrating a specific example of a substrate configuration of a safety controller in accordance with Embodiments 1 and 2 as an example of the present disclosure.

An embodiment serving as an example of the present disclosure (hereinafter also referred to as "Embodiment 1 or 2") is described below with reference to the drawings.

Embodiment 1

§ 1 Application Example

A safety controller 100 is a safety controller that ensures a high level of safety and a high level of reliability by carrying out not only a logic operation process and an input-output control process, each of which is carried out by an industrial control device such as a programmable controller (programmable logic controller, hereinafter abbreviated as "PLC"), but also a safety self-diagnosis process. A safety controller may also be referred to as a "safety controller" or a "safety control device".

In an example of the present disclosure, the safety controller 100 includes: a first MPU 10 and a second MPU 20 connected to each other via a serial bus; a first electric power source 11 and a second electric power source 21, connected via electric power supply lines to the first MPU 10 and the second MPU 20, respectively, for supplying electric power to the first MPU 10 and the second MPU 20, respectively; a first voltage monitoring circuit 12 (1) electrically connected to an electric power supply line extending from the first electric power source 11 to the first MPU 10, (2) connected to the second MPU 20 via a signal line, (3) connected to the second electric power source 21 via an electric power supply line, and (4) including a first AD converter that operates with use of operating electric power obtained from the second electric power source 21; and a second voltage monitoring circuit 22 (1) electrically connected to an electric power supply line extending from the second electric power source 21 to the second MPU 20, (2) connected to the first MPU 10 via a signal line, (3) connected to the first electric power source 11 via an electric power supply line, and (4) including a second AD converter that operates with use of operating electric power obtained from the first electric power source 11.

According to the safety controller 100, a buffer that creates a clock delay is provided in a clock line between the first MPU 10 and the second MPU 20, and the first MPU 10 and the second MPU 20 communicate with each other, without via any Ether PHY, in conformity to an Ethernet protocol.

According to the safety controller 100, the first voltage monitoring circuit 12 (1) monitors a first voltage value, which is a voltage of electric power supplied from the first electric power source 11 to the first MPU 10, with use of a digital signal that indicates the first voltage value and is outputted by the first AD converter which has received an analogue signal that indicates the first voltage value, and (2) upon sensing an anomaly in the first voltage value, transmits, to the second MPU 20, a signal that gives notification of occurrence of the anomaly.

According to the safety controller 100, the second voltage monitoring circuit 22 (1) monitors a second voltage value, which is a voltage of electric power supplied from the second electric power source to the second MPU 20, with use of a digital signal that indicates the second voltage value and is outputted by the second AD converter which has received an analogue signal that indicates the second voltage value, and (2) upon sensing an anomaly in the second voltage value, transmits, to the first MPU 10, a signal that gives notification of occurrence of the anomaly.

As compared with a conventional safety controller, a safety controller (100) that includes the above configuration brings about an effect of achieving, for example, higher speed safe response performance (performance of responding, with a high level of safety and with a high level of reliability, to inputs from various input devices). In other words, as compared with a conventional safety controller, the safety controller (100), for example, (i) allows a logic operation process, an input-output control process, a safety self-diagnosis process, and the like to be carried out at a higher speed, more stably, and with higher accuracy, (ii) enables storage of a record of an execution process, and (iii) achieves a smaller device.

§ 2 Configuration Example

The following description discusses an example of a substrate configuration of a safety controller in accordance with Embodiment 1. FIG. 1 is a view schematically illustrating a specific example of the substrate configuration of the safety controller in accordance with Embodiment 1.

In the example illustrated in FIG. 1, the safety controller 100 is, for example, configured to include an electric power source 101, an electric power shutoff circuit 14, the first micro processing unit (MPU) 10, the first electric power source 11, the first voltage monitoring circuit 12, the second MPU 20, the second electric power source 21, the second voltage monitoring circuit 22, a display control section 30, a seven-segment display 31, and light emitting diodes (LEDs) 32. According to another embodiment, the safety controller 100 preferably further includes a first watchdog timer (WDT) 13 and a second WDT 23. The first WDT 13 and the second WDT 23 will be specifically described in Embodiment 2.

According to Embodiment 1, for example, the electric power source 101, the electric power shutoff circuit 14, the first MPU 10, the first electric power source 11, the first voltage monitoring circuit 12, and the first WDT 13 are provided on a first substrate 1. The second MPU 20, the second electric power source 21, the second voltage monitoring circuit 22, and the second WDT 23 are provided on a second substrate 2. The display control section 30, the seven-segment display 31, and the LEDs 32 are provided on a third substrate 3.

Each of the substrates is constituted by, for example, a printed wiring board (PWB). Electric power or signals can be transmitted/received, via a connector (not illustrated), between the circuits that are provided on the respective different substrates. In FIG. 1, the first MPU 10 provided on the first substrate 1 and the second MPU 20 provided on the second substrate 2 are connected via a serial bus and communicate with each other in conformity to the Ethernet protocol. The first MPU 10 and the second MPU 20 can communicate with each other with use of, for example, a reduced gigabit media independent interface (RGMII) or a serial gigabit media independent interface (SGMII). RGMII and SGMII, each of which serves as a replacement for gigabit media independent interface (GMII) defined in IEEE802.3, each achieve a smaller number of pins.

Such an increase in number of substrates makes it possible to provide a necessary memory and any other circuit without being physically restricted. With this, the safety controller 100 can employ a high performance MPU that has a high processing speed, and, ultimately, can process a remarkably increased amount of information. This allows the safety controller 100 to have remarkably improved safe response performance.

The electric power source 101 supplies electric power to each of the circuits provided on each of the first substrate 1 to the third substrate 3. In accordance with a predetermined condition, the electric power shutoff circuit 14 shuts off electric power supplied to each of the circuits.

The first MPU 10 and the second MPU 20 collectively control the safety controller 100. The first MPU 10 and the second MPU 20 execute various programs, stored in a memory (not illustrated) in advance, so that a predetermined function of the safety controller 100 is carried out. For example, the first MPU (second MPU 20) carries out a process related to safety of, for example, a manufacturing line. For example, the first MPU 10 (second MPU 20) monitors (i) operation of, for example, a robot provided on a manufacturing line and (ii) an environment surrounding the robot. In a case where an anomaly occurs in the robot and the environment surrounding the robot, the first MPU 10 (second MPU 20) senses the anomaly, and, for example, urgently stops the robot.

According to Embodiment 1, the first MPU 10 and the second MPU 20 have a communication interface via which the first MPU 10 and the second MPU 20 transmit/receive data to/from each other. The first MPU 10 and the second MPU 20 each carry out operation of a safety program for achieving a function related to safety, and exchange results of the operation with each other. Then, the first MPU 10 and the second MPU 20 confirm that their respective results of the operation agree with each other. Disagreement between the results of the operation suggests that an anomaly may have occurred in at least one of the first MPU 10 and the second MPU 20. Also in this case, the safety controller 100 can take a measure such as urgent stop of equipment.

The first electric power source 11 supplies, to the first MPU 10, electric power supplied from the electric power source 101. For example, the first electric power source 11 can separate the electric power source into five branches so as to supply electric power to the first MPU 10. Note that the first electric power source 11 also supplies electric power to the second voltage monitoring circuit 22 (described later). For example, the first electric power source 11 can supply electric power of a fifth branch to the second voltage monitoring circuit 22. The second electric power source 21 supplies, to the second MPU 20, electric power supplied from the electric power source 101. As in the case of the first electric power source 11, the second electric power source 21 can separate the electric power source into five branches so as to (i) supply electric power to the second MPU 20 and (ii) supply electric power of a first branch to the first voltage monitoring circuit 12.

The first voltage monitoring circuit 12 monitors a voltage of electric power supplied from the first electric power source 11 to the first MPU 10. Specifically, the first voltage monitoring circuit 12 observes whether a value of a voltage generated by the first electric power source 11 falls within a specified range. In a case where the value of the voltage (hereinafter referred to as a "voltage value") falls outside the specified range, i.e., the voltage value falls below a predetermined lower limit or exceeds a predetermined upper limit, the first voltage monitoring circuit 12 transmits, to the second MPU 20, a signal for giving notification of occurrence of an anomaly in the voltage value.

As in the case of the first voltage monitoring circuit 12, the second voltage monitoring circuit 22 monitors a voltage of electric power supplied from the second electric power source 21 to the second MPU 20. The second voltage monitoring circuit 22 that senses an anomaly in a voltage value transmits, to the first MPU 10, a signal for giving notification of the anomaly.

The display control section 30 controls a display with respect to various displays of the safety controller 100. The safety controller 100 includes a plurality of displays. For example, the displays are assumed to be the seven-segment display 31, n LEDs 32, and the like. For example, the display control section 30 is configured to include a conversion circuit 130 for controlling a display of the seven-segment display 31 and the LEDs 32. The conversion circuit 130 together with the first WDT 13 and the second WDT 23 will be specifically described in Embodiment 2.

§ 3 Operation Example

The following description more specifically discusses (i) a substrate configuration for achieving a safety controller that has high speed safe response performance and (ii) operation of various circuits for achieving such a safety controller.

<Employment of High Performance MPU>

According to Embodiment 1, for example, a high speed MPU that has a clock rate of not less than 1 GHz is preferably employed as each of the first MPU 10 and the second MPU 20. This allows the safety controller 100 to have higher speed safe response performance, and, ultimately, meet a requirement of a safety standard.

As described earlier, according to Embodiment 1, the substrates are separately provided for the first MPU 10, the second MPU 20, and the display control section 30, respectively. This makes it possible to provide a memory and any other circuit, each required by a high speed MPU, without being physically restricted. This makes it possible to employ a high speed MPU as each of the first MPU 10 and the second MPU 20.

(Internal Electric Power Source)

As described earlier, employment of a high speed MPU requires a plurality of electric power source systems such as a core electric power source system and an input-output electric power source system. This causes a lower voltage, and, ultimately, requires a voltage to be monitored with extremely strict accuracy. Thus, in a case where electric power is to be directly supplied to two high speed MPUs from a single electric power source system supplied from an outside of the substrates, operation may be made unstable unless a voltage is monitored with accuracy that can meet such a request. In particular, according to a substrate configuration in which electric power is supplied via a connector as in Embodiment 1, it is usually difficult to meet the request. Furthermore, a physical restriction of basic necessity to provide an electric power source near an MPU is further imposed so that required accuracy of the electric power source is maintained.

In view of the above, according to Embodiment 1, different electric power sources, i.e., the first electric power source 11 and the second electric power source 21 are provided, to a system of the first MPU 10 and a system of the second MPU 20, respectively, on the respective substrates of the safety controller 100. The first electric power source 11 generates, from the electric power source 101 supplied from the outside of the substrates, operating voltages supplied to, for example, (i) the first MPU 10 and (ii) a memory (not illustrated) provided on the first substrate 1, respectively. As in the case of the first electric power source 11, the second electric power source 21 generates, from the electric power source 101, operating voltages supplied to, for example, (i) the second MPU 20 and (ii) a memory (not illustrated) provided on the second substrate 2, respectively.

With the configuration, the electric power source 101 that supplies electric power to an entirety of the substrates is a single system, and electric power sources are provided to respective two systems (i.e., a system of the first substrate 1 and a system of the second substrate 2) on the respective substrates. This allows the safety controller 100 to stably operate even in a case where a substrate is configured to separate into a plurality of substrates.

(Monitoring of Voltage)

In order to meet the requirement of the safety standard, the safety controller 100 provided in a product is required to have a function of monitoring an internal voltage. In a case where a voltage value that falls outside a specified range of voltage specifications determined for each component in advance is detected, a function of transition to a safe state defined in a product is required.

In a conventional configuration in which a comparator is employed for a voltage monitoring circuit, a method of shutting off electric power is employed in a case where a voltage value of a monitored voltage falls outside a range of specifications. In this case, it is difficult for a user to understand a cause of trouble.

In view of the above, according to Embodiment 1, the first voltage monitoring circuit 12 and the second voltage monitoring circuit 22, each of which observes whether a value of a voltage generated by a corresponding one of the first electric power source 11 and the second electric power source 21 falls within a specified range, are provided. According to Embodiment 1, an AD converter is employed as each of the first voltage monitoring circuit 12 and the second voltage monitoring circuit 22.

As compared with a comparator, an AD converter that is employed to monitor a voltage makes it possible to monitor a voltage with higher accuracy. In a case where the first voltage monitoring circuit 12 and the second voltage monitoring circuit 22 detect a voltage anomaly, the first MPU 10 and the second MPU 20 can sense (i) an electric power source in which an anomaly has occurred and (ii) a voltage of the electric power source. The first MPU 10 and the second MPU 20 can keep an anomaly occurrence record in a memory such as an electrically erasable programmable ROM (EEPROM) (Registered Trademark). This allows a user to understand a cause of trouble.

However, assuming that (i) an operating voltage supplied to the first voltage monitoring circuit 12 serving as an AD converter and (ii) a monitored voltage monitored by the first voltage monitoring circuit 12 are identical, the first voltage monitoring circuit 12 unfortunately cannot be guaranteed to operate as a circuit for ensuring safety.

In view of the above, according to Embodiment 1, the electric power source 101 is configured, by the first electric power source 11 and the second electric power source 21, to separate into two systems, as described earlier. On each of the substrates, (i) an operating voltage of each of the voltage monitoring circuits (AD converters) and (ii) a monitored voltage monitored by the each of the voltage monitoring circuits (AD converters) are separated. Specifically, the first voltage monitoring circuit 12 receives, from the second electric power source 21, electric power for the first voltage monitoring circuit 12 to operate. In the example illustrated in FIG. 1, a voltage 2-1 of the first branch, which voltage is supplied from the second electric power source 21, is regarded as an operating voltage of the first voltage monitoring circuit 12. Meanwhile, the first voltage monitoring circuit 12 monitors a voltage value of electric power supplied from the first electric power source 11 to the first MPU 10. In the example illustrated in FIG. 1, the first voltage monitoring circuit 12 regards voltages 1-1 to 1-5 (first voltage values) of the five branches as monitored voltages. In contrast, the second voltage monitoring circuit 22 receives, from the first electric power source 11, electric power for the second voltage monitoring circuit 22 to operate. For example, the voltage 1-5 is regarded as an operating voltage of the second voltage monitoring circuit 22. Meanwhile, the second voltage monitoring circuit 22 regards voltages 2-1 to 2-5 (second voltage values) of the five branches as monitored voltages. This allows an operating voltage of a voltage monitoring circuit (AD converter) and a monitored voltage monitored by the voltage monitoring circuit (AD converter) to be separated by different electric power systems. This makes it possible to guarantee that the voltage monitoring circuit operates as a circuit for ensuring safety.

<Communication Between MPUs>

According to Embodiment 1, the MPUs communicate with each other in conformity to the Ethernet (Registered Trademark) protocol. Ethernet (Registered Trademark), in which a master and a slave do not need to be set, has an advantage of allowing a sender and a receiver to freely send and receive data.

According to Embodiment 1, communication for an exchange of results of operation between the first MPU 10 and the second MPU 20 (cross communication) is carried out, by Mac-to-Mac, in a full duplex communication mode. Specifically, data is directly transmitted/received between media access controls (MACs) of the MPUs. For communication between the MPUs, SPI communication can be used in combination.

Figure 2:
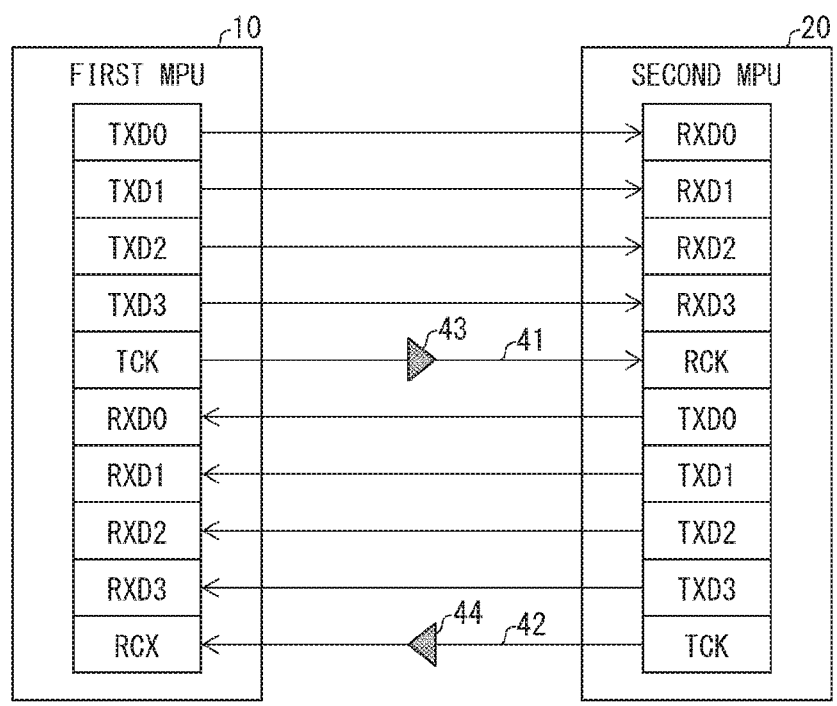
FIG. 2 is a view schematically illustrating a first MPU and a second MPU that are connected by Mac-to-Mac.

FIG. 2 is a view schematically illustrating the first MPU 10 and the second MPU 20 that are connected by Mac-to-Mac. A buffer 43 and a buffer 44 each for creating a clock delay is provided in a clock line 41 and a clock line 42, respectively, between the first MPU and the second MPU.

In a case where Ethernet (Registered Trademark) communication is employed, the MPUs can communicate with each other at a high speed (e.g., 100 Mbps or 1000 Mbps). This makes it possible to overcome a problem of a communication speed, which problem is caused by conventional SPI communication (at approximately 20 MHz) and serves as a bottleneck in achieving higher speed safe response performance.

Embodiment 1 can be configured such that communication conforming to the Ethernet (Registered Trademark) protocol is carried out only between the first MPU 10 and the second MPU 20. In this case, no busy signal is necessary. According to Embodiment 1, a communication protocol can be employed between the first MPU 10 and the second MPU 20 without any OS. In this case, neither an IP header nor a TCP header is necessary.

In Ethernet (Registered Trademark) communication, use of a physical layer dedicated circuit (Ether PHY), an Ether pulse transformer (PT), and a cable connector on an outside of an MPU is standardized. Specifically, the Ethernet protocol provides that by providing an Ether PHY, a clock delay is caused, that is, a delay in a clock signal for a one-half clock is caused to transmitted/received data. However, according to Embodiment 1, the first MPU 10 and the second MPU 20 are separately provided on the respective substrates, but are provided so as to be physically extremely near to each other. Thus, communication between the MPUs is achieved without use of any of an Ether PHY, an Ether PT, and a cable connector, each of which has been described earlier. A method for connecting MACs that are communicably connected without via any of an Ether PHY, an Ether PT, and a cable connector is referred to as "Mac-to-Mac". In a case where the first MPU 10 and the second MPU 20 are connected by Mac-to-Mac, the substrates can be made smaller.

According to Embodiment 1, by providing a buffer in a clock line instead of employing an Ether PHY, a clock delay is caused so that the first MPU 10 and the second MPU 20 can communicate with each other in conformity to the Ethernet protocol. With this, communication between the MPUs which communication allows high speed communication and conforms to the Ethernet (Registered Trademark) can be achieved by an inexpensive circuit configuration without wasteful wiring. Furthermore, an MPU that is designed to employ an Ether PHY can be employed as each of the first MPU 10 and the second MPU 20 of the safety controller 100.

Embodiment 2

§ 1 Application Example

In an example of the present disclosure, a safety controller (100) includes, in addition to the configuration described in Embodiment 1, a plurality of displays (a seven-segment display 31 and LEDs 32); a display control substrate (3) (i) including a serial-parallel conversion integrated circuit (IC) (conversion circuit 130) that receives a display control signal transmitted, in a form of a serial signal, from at least one of a first MPU (10) and a second MPU (20), and (ii) configured to control a display of each of the plurality of displays with use of an output of the serial-parallel conversion IC; a first watchdog timer (WDT) (13) configured to transmit a sensing signal upon sensing at least one of an anomaly and a reset of the first MPU; and a second WDT (23) configured to transmit a sensing signal upon sensing at least one of an anomaly and a reset of the second MPU, the serial-parallel conversion IC having a reset state upon receiving the sensing signal from at least one of the first WDT and the second WDT. As compared with a conventional safety controller, the safety controller (100) that includes the above configuration brings about an effect of (i) allowing a remarkably increased amount of information to be provided to a user and (ii) upon occurrence of an anomaly in an MPU, allowing a user to be made aware of the occurrence of the anomaly in accordance with a display mode of a display.

§ 2 Configuration Example

With reference to FIG. 1, a safety controller 100 in accordance with Embodiment 2 is configured to further include (i) a first WDT 13 provided on a first substrate 1, (ii) a second WDT 23 provided on a second substrate 2, and (iii) a display control section 30, a seven-segment display 31, and LEDs 32 each provided on a third substrate 3. The display control section 30 includes a conversion circuit 130.

§ 3 Operation Example

<Display>
According to Embodiment 2, the safety controller 100 includes not only the LEDs 32 but also the seven-segment display 31 so that a state of the safety controller 100 can be presented so as to be easily understandable to a user. In order to make the LEDs 32 and the seven-segment display 31 more visible, it is preferable to cause each of (i) the LEDs 32 and (ii) the seven-segment display 31 to carry out a display from a front of a housing of the safety controller 100. In a case where the substrates (the first substrate 1 and the second substrate 2) on which the respective MPUs are provided are provided on a side surface of the housing of the safety controller 100, a substrate dedicated to a display (the third substrate 3) needs to be provided separately from the substrates on which the respective MPUs are provided. Specifically, the display control section 30 needs to receive a control signal related to a display (hereinafter referred to as a "display control signal") from the first MPU 10 (second MPU 20) via a connector.

In each of the MPUs, in a case where an output pin is provided for each of the LEDs 32 and each segment of the seven-segment display 31, the connector has an extremely large number of poles. However, an increase in number of poles of the connector is not preferable from the viewpoint of achievement of a simpler and smaller configuration.

In view of the above, Embodiment 2 is configured such that a display control signal is transmitted/received between each of the MPUs and the conversion circuit 130 by serial communication. Embodiment 2 employs a serial-parallel conversion IC as the conversion circuit 130. The serial-parallel conversion IC receives a display control signal, serving as a serial signal, so as to control a display of the plurality of displays (described earlier) in accordance with the display control signal received as the serial signal.

Specifically, the conversion circuit 130, serving as the serial-parallel conversion IC, converts a display control signal, received, as a serial signal, from the first MPU 10 or the second MPU 20, into (i) a first display control signal, serving as a parallel signal, for controlling the seven-segment display 31 and (ii) a second display control signal, serving as a parallel signal, for controlling the LEDs 32. The conversion circuit 130 controls a display of the seven-segment display 31 in accordance with the first display control signal. The conversion circuit 130 controls a display of the LEDs 32 in accordance with the second display control signal.

However, even in a case where an anomaly occurs in the first MPU 10 (second MPU 20), the conversion circuit 130 serving as the serial-parallel conversion IC maintains its state before occurrence of the anomaly. This prevents the conversion circuit 130 from changing a display of various displays in response to the occurrence of the anomaly. This unfortunately prevents a user from being made aware of the occurrence of the anomaly in the MPU in accordance with the display of the various displays.

In view of the above, according to Embodiment 2, the safety controller 100 further includes (i) the first WDT 13 provided on the first substrate 1 and (ii) the second WDT 23 provided on the second substrate 2.

The first WDT 13 monitors operation of the first MPU 10. Specifically, the first WDT 13 which has received a clock signal from the first MPU 10 within a set cycle of a timer resets the timer so as to determine normal operation of a system of the first MPU 10 and then continue monitoring operation of the first MPU 10. In contrast, assume that an anomaly occurs in the system of the first MPU 10 and the first WDT 13 receives no clock signal from the first MPU 10 within the cycle of the timer. In this case, the first WDT 13 supplies, to the conversion circuit 130, a reset signal (sensing signal) derived from a timeout. As in the case of the first WDT 13, the second WDT 23 monitors operation of the second MPU 20 and supplies a reset signal (sensing signal) to the conversion circuit 130 in response to occurrence of an anomaly in the second MPU 20.

The conversion circuit 130 of the display control section 30 resets its state in accordance with the fact that the conversion circuit 130 has received a reset signal from at least one of the WDTs. A display of the displays is reset in accordance with the fact that the state of the conversion circuit 130 has been reset. For example, the conversion circuit 130 causes the seven-segment display 31 to transition to an initial state set in advance. For example, the conversion circuit 130 can turn off lights of all segments of the seven-segment display 31 or illuminate all the segments in red. Alternatively, the conversion circuit 130 can illuminate only a predetermined segment so that the predetermined segment thus illuminated is understood as an error (e.g., the letter E). The conversion circuit 130 causes the LEDs 32 to transition to an initial state set in advance. For example, the conversion circuit 130 can turn off all the LEDs 32 or cause all the LEDs 32 to illuminate in red. Alternatively, the conversion circuit 130 can cause all or part of the LEDs 32 to blink.

This causes the various displays to transition to a display mode (e.g., simultaneous turning-off) during occurrence of an error, so that a user can be immediately made aware that an anomaly has occurred in at least one of the first MPU 10 and the second MPU 20.

[Effect]

According to Embodiments 1 and 2 described earlier, it is possible to achieve a safety controller that has higher speed safe response performance while meeting a requirement of a safety standard.

For example, achievement of higher speed safe response performance makes it possible to shorten a distance, between a product to be monitored (such as a robot) and a user, to be kept so that safety is assured. This brings an advantage of (i) allowing a shorter distance between (a) a fence conventionally provided for protection of a user and (b) a motion space of a robot and a region in which the user is affected by the robot, or (ii) allowing removal of the fence itself.

For example, according to a technique of a conventional technical literature, no specific method for causing a delay for a one-half clock to data in connection between MPUs is disclosed. Thus, communication between MPUs is unachievable merely by interconnecting the MPUs by Mac-to-Mac so as to cause the MPUs to communicate with each other by Ethernet (Registered Trademark) communication. In contrast, as an example of the present disclosure, the safety controller 100 of Embodiment 1 is configured such that a buffer for creating a clock delay is provided in a clock line. This allows high speed MPUs to intercommunicate with each other at a high speed.

Figure 3:
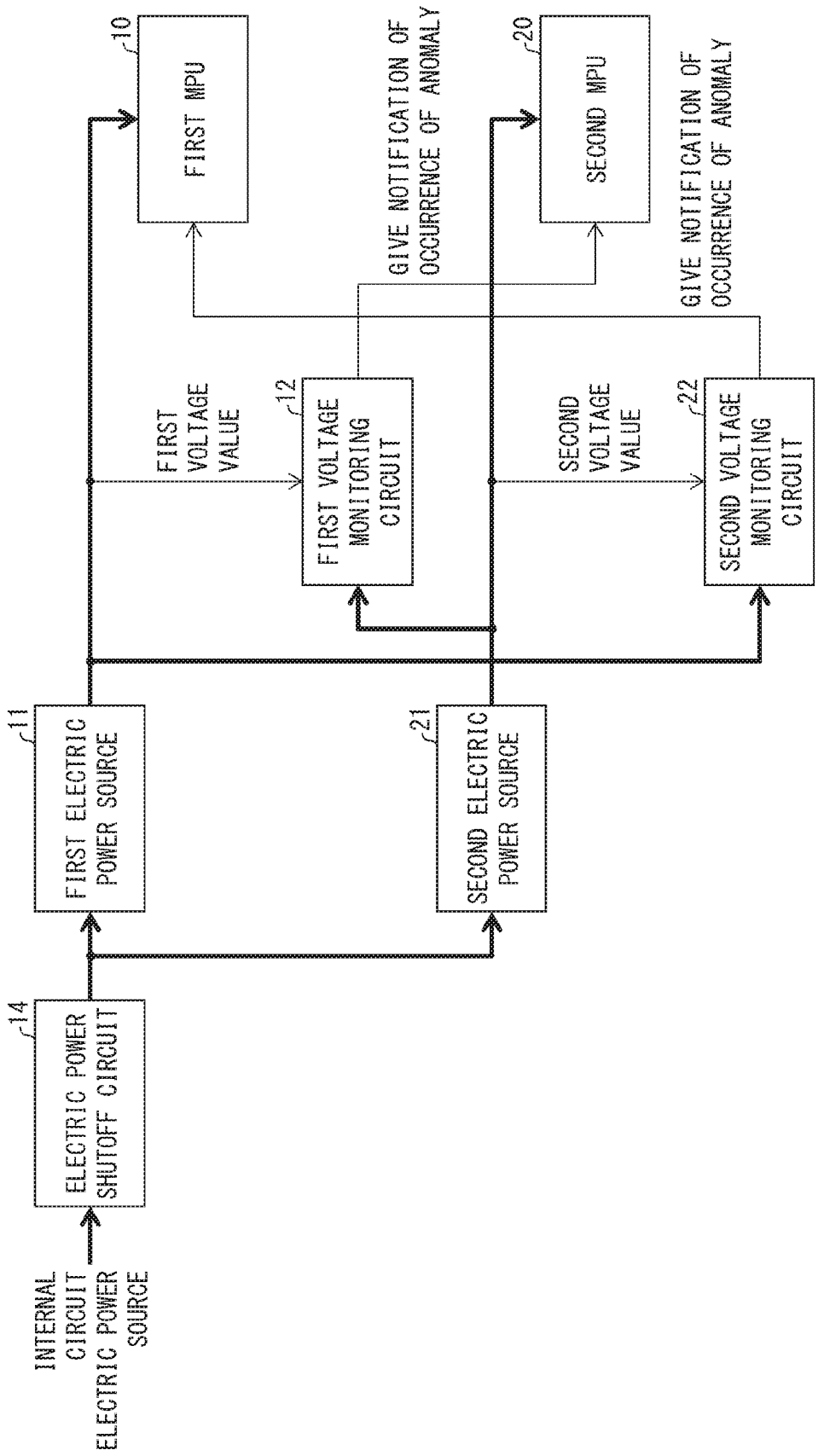
FIG. 3 is a view schematically illustrating an electric power system of a safety controller.

For example, according to a technique of a conventional technical literature, an elevator control electric power source monitoring device is configured such that two external electric power source systems and a single MPU are provided and electric power is shut off in response to detection of an anomaly. In contrast, according to Embodiments 1 and 2 described earlier, the safety controller includes two MPUs that are provided with respect to a single electric power source system (e.g., the electric power source 101) for an internal circuit (see FIG. 3). A voltage monitoring circuit (the second voltage monitoring circuit 22) that obtains electric power from an electric power source (e.g., the first electric power source 11) of a circuit of one of systems so as to monitor a circuit (the second MPU 20) of the other of the systems for an anomaly is configured to give notification to the first MPU 10 of the one of the systems upon detecting an anomaly in the other of the systems. This makes it possible to overcome inconvenience of being difficult for a user to understand a cause of trouble.

(Supplemental Remarks)

In an example of the present disclosure, a safety controller includes: a first MPU and a second MPU connected to each other via a serial bus; a first electric power source and a second electric power source, connected via electric power supply lines to the first MPU and the second MPU, respectively, for supplying electric power to the first MPU and the second MPU, respectively; a first voltage monitoring circuit (1) electrically connected to an electric power supply line extending from the first electric power source to the first MPU, (2) connected to the second MPU via a signal line, (3) connected to the second electric power source via an electric power supply line, and (4) including a first AD converter that operates with use of operating electric power obtained from the second electric power source; and a second voltage monitoring circuit (1) electrically connected to an electric power supply line extending from the second electric power source to the second MPU, (2) connected to the first MPU via a signal line, (3) connected to the first electric power source via an electric power supply line, and (4) including a second AD converter that operates with use of operating electric power obtained from the first electric power source, the first MPU and the second MPU communicating with each other in conformity to an Ethernet protocol without via any Ether PHY while a buffer for creating a clock delay is provided in a clock line between the first MPU and the second MPU, the first voltage monitoring circuit (1) monitoring a first voltage value, which is a voltage of electric power supplied from the first electric power source to the first MPU, with use of a digital signal that indicates the first voltage value and is outputted by the first AD converter which has received an analogue signal that indicates the first voltage value, and (2) upon sensing an anomaly in the first voltage value, transmitting, to the second MPU, a signal that gives notification of occurrence of the anomaly, and the second voltage monitoring circuit (1) monitoring a second voltage value, which is a voltage of electric power supplied from the second electric power source to the second MPU, with use of a digital signal that indicates the second voltage value and is outputted by the second AD converter which has received an analogue signal that indicates the second voltage value, and (2) upon sensing an anomaly in the second voltage value, transmitting, to the first MPU, a signal that gives notification of occurrence of the anomaly.

With the configuration, the safety controller brings about an effect of achieving, for example, higher speed safe response performance (performance of responding, with a high level of safety and with a high level of reliability, to inputs from various input devices). In other words, as compared with a conventional safety controller, the safety controller, for example, (i) allows a logic operation process, an input-output control process, a safety self-diagnosis process, and the like to be carried out at a higher speed and with higher accuracy, (ii) enables storage of a record of an execution process, and (iii) achieves a smaller device.

Specifically, employment of an MPU having a high speed clock (e.g., 1 GHz) results in a further increase in memory or peripheral circuitry (e.g., an electric power source) as compared with the case of employment of an MPU having an ordinary processing speed (e.g., 120 MHz). However, in a case where a plurality of substrates are provided, it is possible to provide the peripheral circuitry described earlier. This makes it possible to employ an MPU having a high speed clock.

With the configuration, it is possible to provide an electric power source for each of the substrates. This results in achievement of more excellent operational stability. Further, by causing the AD converter to monitor a voltage, it is possible to (i) monitor a voltage with higher accuracy and (ii) keep a record in a case where an anomaly occurs.

Furthermore, MPUs can communicate with each other at a higher speed by communication conforming to an Ethernet (Registered Trademark) protocol. Moreover, the substrates can be made smaller by connecting the MPUs by Mac-to-Mac.

In an example of the present disclosure, the safety controller further includes: a plurality of displays; a display control substrate (i) including a serial-parallel conversion integrated circuit (IC) that receives a display control signal transmitted, in a form of a serial signal, from at least one of the first MPU and the second MPU, and (ii) configured to control a display of each of the plurality of displays with use of an output of the serial-parallel conversion IC; a first watchdog timer (WDT) configured to transmit a sensing signal upon sensing at least one of an anomaly and a reset of the first MPU; and a second WDT configured to transmit a sensing signal upon sensing at least one of an anomaly and a reset of the second MPU, the serial-parallel conversion IC having a reset state upon receiving the sensing signal from at least one of the first WDT and the second WDT. The configuration brings about an effect of allowing a user to be made aware of occurrence of an anomaly in accordance with the fact that a display mode of a display has become a non-display mode, even in a case where a serial-parallel conversion IC is employed.

Specifically, in order that a display is disposed more freely (e.g., disposed on a front of a device), the safety controller can be configured such that a display control substrate is provided separately from a substrate on which to provide an MPU. In this case, a serial-parallel conversion IC can be provided on the display control substrate so that the number of pins of connectors of the display control substrate and the substrate on which to provide the MPU is reduced. However, even in a case where an anomaly occurs in the MPU, the serial-parallel conversion IC maintains its state. This unfortunately makes it impossible to change a display of the display in response to occurrence of the anomaly in the MPU.

In view of the above, the safety controller includes a WDT as an example of the present disclosure. Since the WDT transmits, to the serial-parallel conversion IC, a sensing signal (e.g., a reset signal) that gives notification of occurrence of an anomaly in the MPU, the serial-parallel conversion IC can reset its state in accordance with the sensing signal. This allows each of various displays to change a display mode by being triggered by the occurrence of the anomaly in the MPU. As a result, a user can be made aware of the occurrence of the anomaly in the MPU in accordance with the display mode of a display. Note that a change in display mode of a display includes, for example, turning-off of a light of a display.

Note that the embodiments described above are merely examples of the present invention in all aspects. It is of course possible to make various improvements and modifications to the embodiments without departing from the scope of the present invention. That is, the present invention can be carried out by employing, as appropriate, a specific configuration suited to each of the embodiments. Note that natural language, in which data appearing in the embodiments is explained, is more specifically designated by any of pseudo-language, a command, a parameter, a machine language, and the like, each of which can be recognized by a computer.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 First substrate, 2 Second substrate, 3 Third substrate (display control substrate), 10 First MPU, 11 First electric power source, 12 First voltage monitoring circuit (AD converter), 13 First WDT, 14 Electric power shutoff circuit, 20 Second MPU, 21 Second electric power source, 22 Second voltage monitoring circuit (AD converter), 23 Second WDT, 30 Display control section, 31 Seven-segment display (display), 32 LED (display), 41, 42 Clock line, 43, 44 Buffer, 100 Safety controller, 101 Electric power source, 130 Conversion circuit (serial-parallel conversion IC)

The invention claimed is:
1. A safety controller comprising:
a first micro processing unit (MPU) and a second MPU connected to each other via a serial bus;
a first electric power source, connected via a first set of electric power supply lines to the first MPU, for supplying electric power to the first MPU;
a second electric power source, connected via a second set of electric power supply lines to the second MPU, for supplying electric power to the second MPU;
a first voltage monitoring circuit (1) electrically connected to one of the first set of electric power supply lines extending from the first electric power source to the first MPU, (2) connected to the second MPU via a first signal line, (3) connected to the second electric power source via one of the second set of electric power supply lines, and (4) including a first analog-to-digital (AD) converter that operates with use of operating electric power obtained from the second electric power source; and
a second voltage monitoring circuit (1) electrically connected to one of the second set of electric power supply lines extending from the second electric power source to the second MPU, (2) connected to the first MPU via a second signal line, (3) connected to the first electric power source via one of the first set of electric power supply lines, and (4) including a second AD converter that operates with use of operating electric power obtained from the first electric power source,
the first MPU and the second MPU communicating with each other in conformity to an Ethernet protocol without an Ether physical layer (PHY) while a buffer for creating a clock delay is provided in a clock line between the first MPU and the second MPU,
the first voltage monitoring circuit (1) monitoring a first voltage value, which is a voltage of electric power supplied from the first electric power source to the first MPU, with use of a digital signal that indicates the first voltage value and is outputted by the first AD converter which has received an analogue signal that indicates the first voltage value, and (2) upon sensing an anomaly in the first voltage value, transmitting, to the second MPU, a signal that gives notification of occurrence of the anomaly, and
the second voltage monitoring circuit (1) monitoring a second voltage value, which is a voltage of electric power supplied from the second electric power source to the second MPU, with use of a digital signal that indicates the second voltage value and is outputted by the second AD converter which has received an analogue signal that indicates the second voltage value, and (2) upon sensing an anomaly in the second voltage value, transmitting, to the first MPU, a signal that gives notification of occurrence of the anomaly.

2. A safety controller as set forth in claim 1, further comprising:
a plurality of displays;
a display control substrate (i) including a serial-parallel conversion integrated circuit (IC) that receives a display control signal transmitted, in a form of a serial signal, from at least one of the first MPU and the second MPU, and (ii) configured to control a display of each of the plurality of displays with use of an output of the serial-parallel conversion IC;

a first watchdog timer (WDT) configured to transmit a sensing signal upon sensing at least one of an anomaly and a reset of the first MPU; and a second WDT configured to transmit a sensing signal upon sensing at least one of an anomaly and a reset of the second MPU, the serial-parallel conversion IC having a reset state upon receiving the sensing signal from at least one of the first WDT and the second WDT.

\* \* \* \* \*